US011386535B2

(12) United States Patent
Cian et al.

(10) Patent No.: US 11,386,535 B2
(45) Date of Patent: *Jul. 12, 2022

(54) IMAGE BLENDING METHOD AND PROJECTION SYSTEM

(71) Applicant: Coretronic Corporation, Hsin-Chu (TW)

(72) Inventors: Jyun-Lin Cian, Hsin-Chu (TW); Chi-Wei Lin, Hsin-Chu (TW); Chien-Chun Peng, Hsin-Chu (TW); Yung-Chiao Liu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 404 days.

This patent is subject to a terminal disclaimer.

(21) Appl. No.: 16/663,357

(22) Filed: Oct. 25, 2019

(65) Prior Publication Data

US 2020/0134798 A1    Apr. 30, 2020

(30) Foreign Application Priority Data

Oct. 31, 2018 (CN) .......................... 201811286626.8

(51) Int. Cl.
*G06T 5/00* (2006.01)
*G06T 5/50* (2006.01)
(Continued)

(52) U.S. Cl.
CPC ................ *G06T 5/50* (2013.01); *G03B 35/20* (2013.01); *G06T 7/90* (2017.01); *H04N 9/3147* (2013.01);
(Continued)

(58) Field of Classification Search
CPC .. H04N 9/3179; H04N 9/3182; H04N 9/3147; G06T 5/50; G06T 5/00; G06T 7/90; G06T 2207/20212
See application file for complete search history.

(56) References Cited

U.S. PATENT DOCUMENTS 11,082,672 B2 * 8/2021 Cian .......................... G06T 7/73
2011/0234920 A1    9/2011 Nelson
(Continued)

FOREIGN PATENT DOCUMENTS

CN    101017316    8/2007
CN    101116049    1/2008
(Continued)

OTHER PUBLICATIONS

"Office Action of China Counterpart Application", dated Apr. 29, 2021, p. 1-p. 21.
(Continued)

*Primary Examiner* — Sean T Motsinger
(74) *Attorney, Agent, or Firm* — JCIPRNET

(57) ABSTRACT

The disclosure provides an image blending method. The method includes projecting a first image and a second image onto a projection surface by a first projector and a second projector, respectively, and the first image and the second image overlap each other; and projecting the first control pattern onto the first image, adjusting the first control pattern such that a first control pattern frame matches a boundary of an overlapping area, and thereby identifying a position of a first non-overlapping area in the first image. Additionally, a similar operation is performed by the second projector to identify a second non-overlapping area in the second image. All pixels in the first non-overlapping area and the second non-overlapping area are adjusted such that the black-level brightness of the first non-overlapping area and the second non-overlapping area correspond to the black-level brightness of the overlapping area to obtain better brightness uniformity.

18 Claims, 9 Drawing Sheets

(51) Int. Cl.
*G06T 7/90* (2017.01)
*G03B 35/20* (2021.01)
*H04N 9/31* (2006.01)

(52) U.S. Cl.
CPC . *H04N 9/3179* (2013.01); *G06T 2207/10012* (2013.01); *G06T 2207/20212* (2013.01)

(56) References Cited

U.S. PATENT DOCUMENTS

| | | | | |
|---|---|---|---|---|
| 2013/0321782 | A1* | 12/2013 | Ishii | H04N 9/3147 353/121 |
| 2014/0104581 | A1* | 4/2014 | Yoshimura | G03B 21/147 353/30 |
| 2014/0354674 | A1 | 12/2014 | Okamoto et al. | |
| 2018/0139422 | A1* | 5/2018 | Moule | G06T 7/13 |
| 2020/0134798 | A1* | 4/2020 | Cian | H04N 9/3185 |
| 2020/0137367 | A1* | 4/2020 | Cian | H04N 9/3182 |
| 2021/0329202 | A1* | 10/2021 | Cian | G06T 3/4038 |

FOREIGN PATENT DOCUMENTS

| | | |
|---|---|---|
| CN | 106030404 | 10/2016 |
| CN | 108076332 | 5/2018 |
| EP | 0556304 | 8/1993 |
| EP | 1613071 | 1/2006 |

OTHER PUBLICATIONS

"Office Action of China Counterpart Application", dated Apr. 30, 2021, pp. 1-13.

* cited by examiner

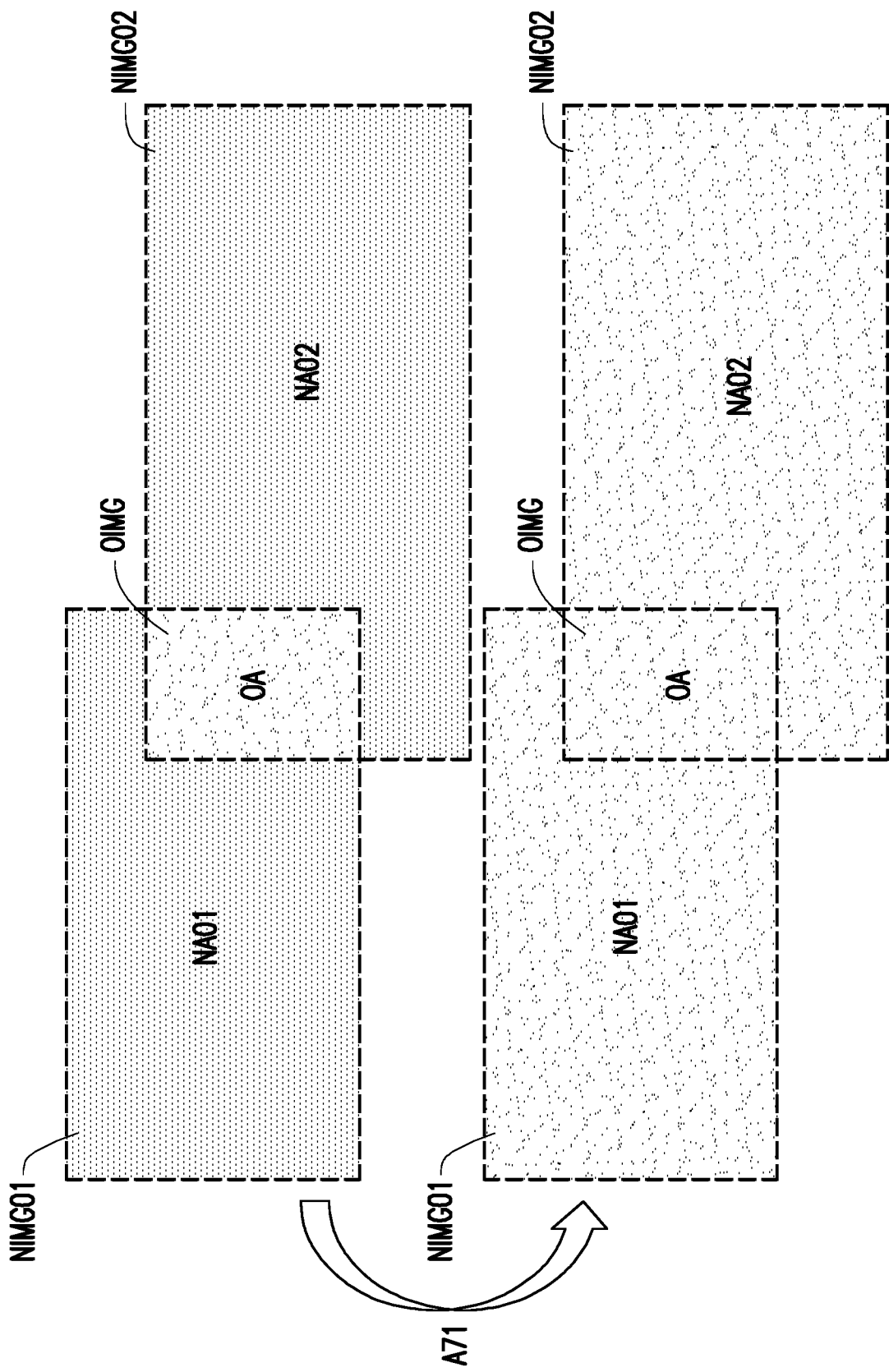

IMAGE BLENDING METHOD AND PROJECTION SYSTEM

CROSS-REFERENCE TO RELATED APPLICATION

This application claims the priority benefit of China application serial no. 201811286626.8, filed on Oct. 31, 2018. The entirety of the above-mentioned patent application is hereby incorporated by reference herein and made a part of this specification.

BACKGROUND OF THE DISCLOSURE

Field of the Disclosure

The disclosure relates to a projection method, and in particular to an image blending method and a projection system.

Description of Related Art

At present, when a projector performs blending applications, when multiple images projected by multiple projectors are blended together, the black-level brightness of the image at the overlapping part is much higher than the black-level brightness of the image of the non-overlapping area. However, the typically known dark field compensation method adjusts each of rectangular ranges by controlling each projector to output one or more fixed rectangular ranges, such that all rectangular ranges can cover the non-overlapping part of the image projected by the corresponding projector.

FIG. 1 is a schematic diagram illustrating a known image blending operation. Referring to FIG. 1, for example, it is assumed that a projector 10 and a projector 20 are respectively used for projecting a first image IMG01 and a second image IMG02 as a fully black image. It should be noted that the black-level brightness of an image OIMG at the overlapping part between the first image IMG01 and the second image IMG02 is higher. Typically, a rectangular area RA1 is set in the first image IMG01 by the projector 10 to cover the non-blended image IMG01(1) above the image OIMG in the first image IMG01, and another rectangular area RA2 is set to cover the non-blended image IMG01(2) on the left side of the image OIMG in the first image IMG01. Next, the projector 10 increases grayscale values of all the pixels of images IMG01(1) and IMG01(2) in the non-overlapping area, so that a black-level brightness of the images IMG01(1) and IMG01(2) in the non-overlapping area is similar to or equal to a black-level brightness of the image OIMG in the overlapping area. Similarly, the conventional method also uses another projector 20 to set a rectangular area RA3 in the second image IMG02 to cover an image IMG02(1) in the non-overlapping area below the image OIMG in the second image IMG02, and set another rectangular area RA4 to cover an image IMG02(2) in the non-overlapping area on the right side of the image OIMG in the second image IMG02. Next, the projectors 10 and 20 increase the grayscale values of all the pixels of the images IMG02(1) and IMG02(2) in the non-overlapping area, such that the black-level brightness of the images IMG02(1) and IMG02(2) in the non-overlapping area is similar to or equal to the black-level brightness of the image OIMG in the overlapping area.

However, the above method requires four rectangles to cover the images in all of the non-overlapping areas. Therefore, the conventional method performs the setting of the rectangular area four times to set four rectangles, which leads to excessive adjustment operations and reduces the efficiency of the image blending operation. Therefore, it has drawn the attention of practitioners of the field to find out how to improve the efficiency of image blending operation for multiple images projected by multiple projectors.

The information disclosed in this BACKGROUND section is only for enhancement of understanding of the BACKGROUND section of the described technology and therefore it may contain information that does not form the prior art that is already known to a person of ordinary skill in the art. Further, the information disclosed in the BACKGROUND section does not mean that one or more problems to be resolved by one or more embodiments of the disclosure were acknowledged by a person of ordinary skill in the art.

SUMMARY OF THE DISCLOSURE

The disclosure provides an image blending method and a projection system, which are used for adjusting a plurality of control patterns to match the overlapping areas in a plurality of images projected by a plurality of projectors, thereby adjusting image parameters of images in non-overlapping areas, thus obtaining the effect of image blending with better brightness uniformity.

The image blending method of the disclosure is used for multiple images projected by a plurality of projectors. The method includes projecting a first image and a second image onto a projection surface respectively by a first projector of the plurality of projectors and a second projector of the plurality of projectors, wherein the first image and the second image overlap each other in the overlapping area; projecting a first control pattern onto the first image by the first projector; adjusting the first control pattern in the first image by the first projector according to a first input operation applied to a first input interface of the first projector, such that a first control pattern frame of the first control pattern matches a boundary of the overlapping area; identifying a position of the first non-overlapping area in the first image by the first projector according to the position of the matched first control pattern frame, wherein the first non-overlapping area of the first image does not overlap the second image. In addition, a second control pattern is projected onto the second image by the second projector; and the second control pattern in the second image is adjusted by the second projector according to a second input operation applied to a second input interface of the second projector, so that the second control pattern frame of the second control pattern matches the boundary of the overlapping area; and a position of the second non-overlapping area in the second image is identified by the second projector according to the position of the matched second control pattern frame, wherein the second non-overlapping area of the second image does not overlap the first image. On the other hand, the first projector and the second projector are further used to adjust the image parameters of all the pixels in the first non-overlapping area and the second non-overlapping area according to the position of the first non-overlapping area and the position of the second non-overlapping area, such that the black-level brightness of the first non-overlapping image in the first non-overlapping area of the first image and the black-level brightness of the second non-overlapping image in the second non-overlapping area of the second image correspond to the black-level brightness of the overlapping image in the overlapping area.

A projection system includes a first projector and a second projector. The first projector includes a first processor, a first input interface, a first connection interface, and a first projection module, wherein the first connection interface receives first image data. The second projector includes a second processor, a second input interface, a second connection interface, and a second projection module, wherein the second connection interface receives second image data. The first processor is configured to instruct the first projection module to project the first image onto a projection surface according to the first image data, and the second processor is configured to instruct the second projection module to project the second image onto the projection surface according to the second image data, wherein the image of a first portion of the first image projected onto the projection surface and the image of a second portion of the second image overlap each other in the overlapping area on the projection surface. In addition, the first processor is further configured to render the first control pattern, and instruct the first projection module to project the first control pattern onto the first image, wherein the first processor is configured to adjust the first control pattern in the first image according to the first input operation applied to the first input interface, such that the first control pattern frame of the first control pattern matches the boundary of the overlapping area, wherein the first processor is configured to identify the position of the first non-overlapping area in the first image according to the position of the matched first control pattern frame, wherein the first non-overlapping area of the first image does not overlap the second image. Likewise, the second processor is configured to render the second control pattern, and instruct the second projection module to project the second control pattern onto the second image, wherein the second processor is configured to adjust the second control pattern in the second image according to the second input operation applied to the second input interface, such that the second control pattern frame of the second control pattern matches the boundary of the overlapping area, wherein the second processor is configured to identify the position of the second non-overlapping area in the second image according to the position of the matched second control pattern frame, wherein the second non-overlapping area of the second image does not overlap the first image. In addition, the first processor and the second processor are respectively configured to adjust image parameters of all the pixels in the first non-overlapping area and the second non-overlapping area according to the position of the first non-overlapping area and the position of the second non-overlapping area, such that the black-level brightness of the first non-overlapping image in the first non-overlapping area of the first image and the black-level brightness of the second non-overlapping image in the second non-overlapping area of the second image correspond to the black-level brightness of the overlapping image in the overlapping area.

Based on the above, the image blending method and the projection system provided by the embodiments of the disclosure may project multiple control patterns, and identify a plurality of non-overlapping areas of the plurality of images by adjusting multiple control patterns to match overlapping areas between multiple images projected by multiple projectors, thus adjusting the image parameters of the images in the plurality of non-overlapping areas, so that the black-level brightness of all of the plurality of projected images are uniform. In this manner, not only that the multiple steps of the blackening process in the image blending operation can be simplified, the non-overlapping areas with irregular shapes can also be efficiently identified, and time consumed for the image blending operation for multiple projection images can be reduced, which in turn increases the overall operation efficiency of the projection system.

In order to make the aforementioned features and advantages of the disclosure more comprehensible, embodiments accompanying figures are described in detail below.

BRIEF DESCRIPTION OF THE DRAWINGS

FIG. 7 is a schematic diagram illustrating an image blending operation performed by a projection system according to an embodiment of the disclosure.

DESCRIPTION OF EMBODIMENTS

The above and other technical contents, features and effects of the disclosure will be clear from the below detailed description of an embodiment of the disclosure with reference to accompanying drawings. The directional terms mentioned in the embodiments below, like "above", "below", "left", "right", "front", and "back" refer to the directions in the appended drawings. Therefore, the directional terms are only used for illustration instead of limiting the disclosure.

Figure 1:
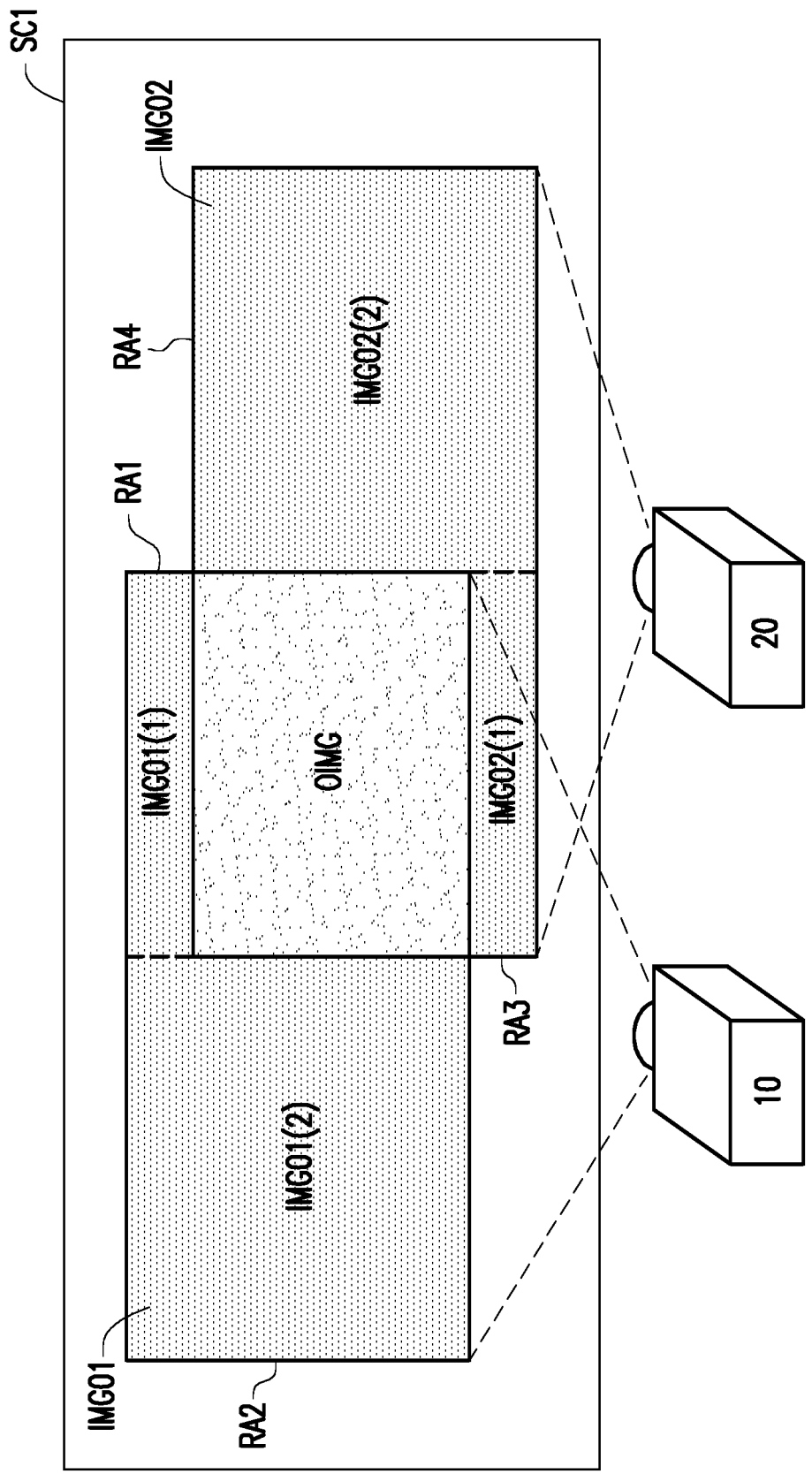
FIG. 1 is a schematic diagram illustrating a known image blending operation.
Figure 2:
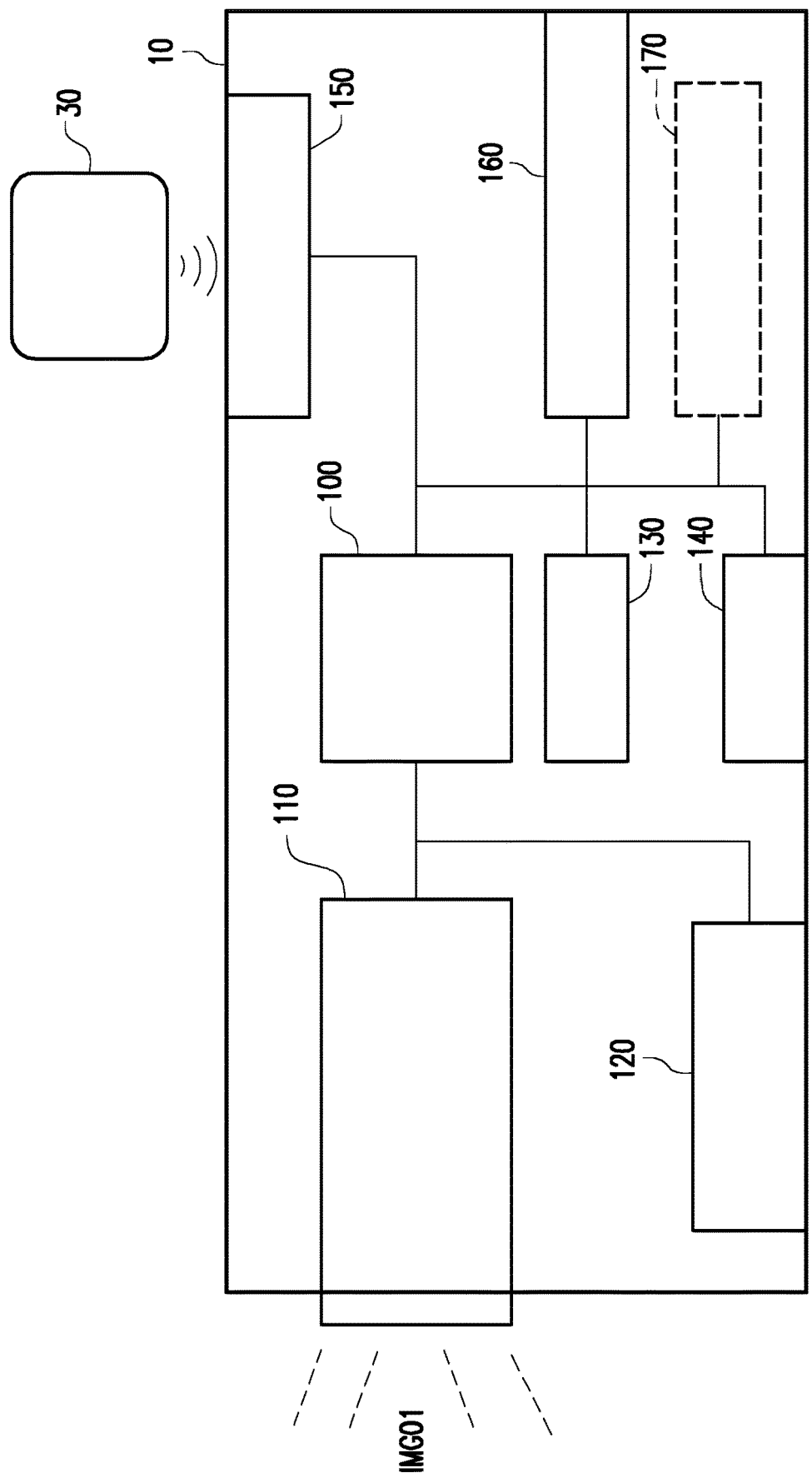
FIG. 2 is a block diagram illustrating a projector according to an embodiment of the disclosure.
Figure 4:
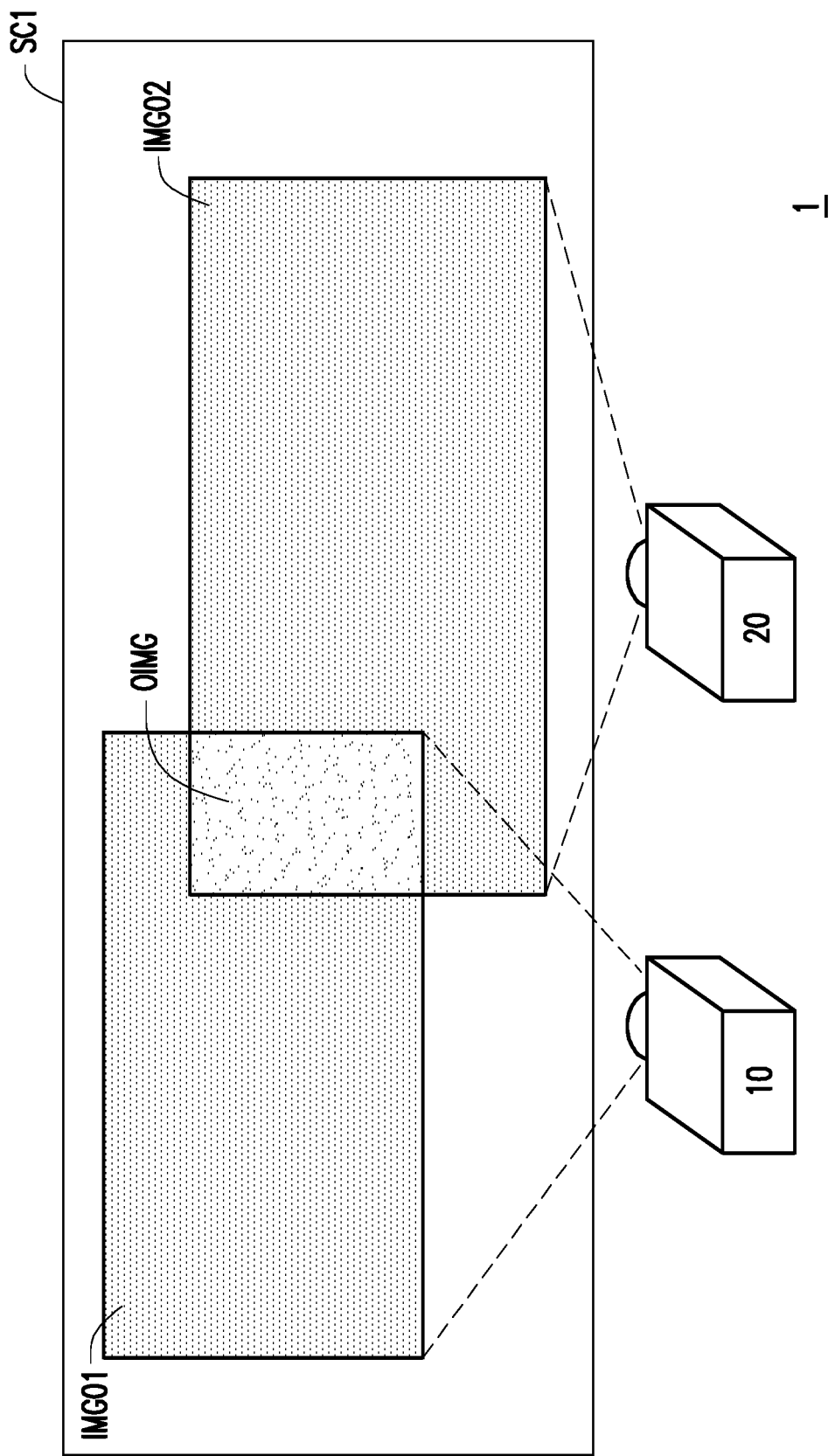
FIG. 4 is a schematic view of a projection system according to an embodiment of the disclosure.

Please refer to FIG. 2 and FIG. 4. Referring to FIG. 4 first, in the embodiment, a projection system 1 includes a plurality of projectors 10, 20, and the projection system 1 has at least two projectors. Since the hardware configuration of the projector 20 may be the same as that of the projector 10, the hardware components of the projector 10 are described below with reference to FIG. 2 only.

FIG. 2 is a block diagram illustrating a projector according to an embodiment of the disclosure. Referring to FIG. 2, the projector 10 (also referred to as a first projector) includes a processor 100 (also referred to as a first processor), a projection module 110 (also referred to as a first projection module), a power management circuit unit 120 (also known as a first power management circuit unit), a storage device 130 (also referred to as a first storage device), a display 140 (also referred to as a first display), an input interface 150 (also referred to as a first input interface), and a connection interface 160 (also known as the first connection interface). The processor 100 is coupled to the projection module 110, the power management circuit unit 120, the storage device 130, the display 140, the input interface 150, and the connection interface 160. In another embodiment, the projector 10 further includes a communication circuit unit 170 (also referred to as a first communication circuit unit) coupled to the processor 100, and the communication circuit unit 170 is configured to be connected to other projectors or the Internet in a wired or wireless manner to access data or instructions.

In the embodiment, the processor 100 is hardware having computing capabilities or includes an execution program for managing the overall operation of the projector 10. In this embodiment, the processor 100 is, for example, a core or multi-core central processing unit (CPU), a programmable micro-processor, a digital signal processor (DSP), a programmable controller, an application specific integrated circuit (ASIC), a programmable logic device (PLD), or other similar devices.

The projection module 110 is configured to receive image data from the processor 100 (the first image data provided from an external data terminal (such as a computer or a smart phone, etc.) to the processor 100 of the projector 10, the first image data is stored in the storage device 130, or the image data of the control pattern provided by the processor 100, the image data of the control pattern may be from the storage device 130 or an external data terminal), and an image beam is projected according to the image data to form a first image of a corresponding image data projected on a projection plane (such as a screen or wall). The projection module 110 includes a light source module and an optical engine. The optical engine includes a light valve and a projection lens. The light source module is used to provide an illumination beam. The light valve is, for example, a reflective or transmissive spatial light modulator, such as a digital micro-mirror device (DMD) or reflective liquid crystal on silicon (LCOS), and the like in the case of reflective spatial light modulator, or such as a transparent liquid crystal panel in the case of transmissive spatial light modulator. In addition, depending on a method of inputting control signal, the spatial light modulator is, for example, an optically addressed spatial light modulator (OASLM) or an electrically addressed spatial light modulator (EASLM), the disclosure provides no limitation to the form and type of the light valve.

In addition, the light valve is disposed on a transmission path of the illumination beam and is used to convert the illumination beam into an image beam. The projection lens is disposed on the transmission path of the image beam and is used to project the image beam out of the projection module 110.

The power management circuit unit 120 is configured for managing power of the projector 10, and the power management circuit unit 120 is also configured for receiving power (for example, city power, or other forms of external power) from the outside. The power management circuit unit 120 may also be provided with an independent internal power source, such as a battery.

The storage device 130 is configured to temporarily store data through an instruction of the processor 100, and the data includes data for managing the projector 10, the data received from an external electronic device (host system such as a personal computer, a notebook computer or a server), the data transmitted to the host system, or other types of data, the disclosure is not limited thereto. The above-mentioned data includes, for example, control parameters of various components of the projector or image signals. In addition, the storage device 130 may also record some data that needs to be stored for a long time through the instruction of the processor 100, for example, related information or recorded data corresponding to image blending, and firmware or software for managing the projector 10. It is worth mentioning that the storage device 130 may be any form of non-volatile memory storage device or volatile memory storage device. For example, the storage device 130 is, for example, a movable random access memory (RAM), a read-only memory (ROM), a flash memory, or the like, or a combination of the above components.

The display 140 is used to display an image or text content of a corresponding operational function of the projector. For example, the display 140 may be a liquid crystal display (LCD), a light-emitting diode (LED) display, or a field emission display (FED). The display 140 is disposed on the housing of the projector 10.

The input interface 150 is configured to receive an input operation applied by the user to the input interface to generate a corresponding control signal. The processor 100 may perform a corresponding function or operation according to the input signal. The input interface 150 may include a plurality of buttons (keys), switches, or knobs corresponding to different functions and is disposed on the housing of the projector 10. The input interface 150 may also be connected to other external input devices (e.g., keyboard, mouse, etc.) In another embodiment, the input interface 150 also has an infrared receiver to receive infrared (also referred to as remote input operation) from a remote control 30, thereby generating corresponding control signals to the processor 100 to perform the corresponding functions. It should be noted that the disclosure is not limited to the specific forms of the various input operations disclosed in the following embodiments. The plurality of input operations may be implemented by pressing a button, using a touch screen, clicking a mouse, using a keyboard, or the like, or a combination thereof.

In an embodiment, the display 140 may also be integrated with the input interface 150 as a touch screen composed of, for example, a resistive, capacitive or optical touch panel to provide display and touch input functions simultaneously.

The connection interface 160 is used to be connected to a data terminal (not shown) to receive image data from the data terminal. The data terminal is, for example, any electronic device capable of outputting image data, such as a personal computer, a notebook computer, a server host external storage device, a smart phone, a tablet PC, and the like. The connection interface 160 is a circuit interface that includes a plurality of input interfaces. The input interface is, for example, an input interface conforming to a Video Graphics Array (VGA) standard, a Digital Visual Interface (DVI) standard, a High Definition Multimedia Interface (HDMI) standard, or other suitable standards (for example, DisplayPort standard, 3G-SDI, HDBaseT). However, the disclosure is not limited thereto. For example, in another embodiment, the connection interface 160 may also include being compatible with Serial Advanced Technology Attachment (SATA) standard. However, it should be indicated that the disclosure is not limited thereto, and the connection interface 160 may also be an interface circuit unit conforming to Parallel Advanced Technology Attachment (PATA) standard, Institute of Electrical and Electronic Engineers (IEEE) 1394 standard, Peripheral Component Interconnect Express (PCI Express) standard, Universal Serial Bus (USB) standard, Ultra High Speed-I (UHS-I) interface standard, Ultra High Speed-II (UHS-II) interface standard, Secure Digital (SD) interface standard, Memory Stick (MS) interface standard, Multi Media Card (MMC) interface standard, Compact Flash (CF) interface standard, Integrated Device Electronics (IDE) standard or other suitable standards.

The communication circuit unit 170 may have a wireless communication module (not shown) and support one of Wireless Fidelity (WiFi) system and Bluetooth communication technology or a combination thereof, and is not limited thereto. In addition, the communication circuit unit 170 may further include a network interface card (NIC) connected to the network through the connected network cable. In other words, the communication circuit unit 170 may be connected to the local area network or the Internet in a wired or wireless manner to access data or instructions.

Figure 3:
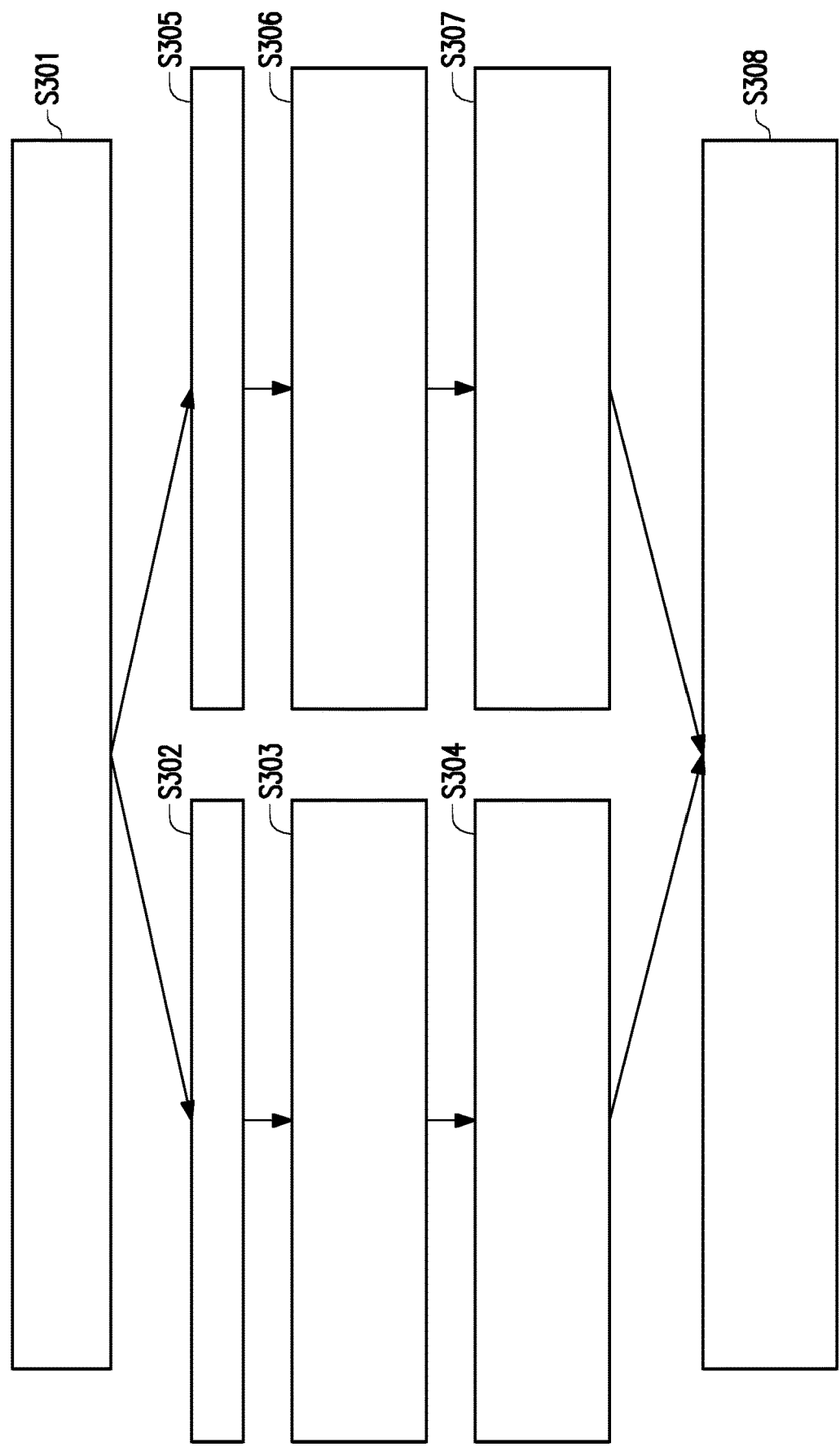
FIG. 3 is a flowchart of an image blending method according to an embodiment of the disclosure.

It should be noted that the descriptions regarding the function of the various components of the projector 10 are merely illustrative and are not intended to limit the disclosure. Further, as described above, the projector 20 has the same structure as the projector 10. For example, the projector 20 (also referred to as a second projector) includes a second processor, a second projection module, a second power management circuit unit, the second storage device, the second display, the second input interface, and the second connection interface. In another embodiment, the projector 20 further includes a second communication circuit unit coupled to the second processor. The details of the hardware of the second projector are omitted. FIG. 3 is incorporated below to describe details of the image blending method provided by the embodiment of the disclosure as well as the corresponding image blending operation performed by the projection system by using the image blending method. It should be noted that the processor of each of the projectors in the projection system 1 accesses and executes a plurality of program codes (performing an image blending operation or a blackening operation) to implement the image blending method (also known as blackening method) provided by the embodiments of the disclosure. The so-called blackening is to make the user to visually perceive that the grayscale value of the blended image picture approximately appears in a consistent manner when the blended image picture is shown as black picture.

FIG. 3 is a flowchart of an image blending method according to an embodiment of the disclosure. Referring to FIG. 3, in step S301, the first image and the second image are respectively projected onto the projection surface by the first projector and the second projector, wherein the image of the first portion of the first image projected on the projection surface and the image of the second portion of the second image overlap in the overlapping area of the projection surface.

FIG. 4 is a schematic view of a projection system according to an embodiment of the disclosure. Referring to FIG. 4, for example, the user triggers the first processor 100 and the second processor to perform an image blending operation (or a blackening operation) by using the first input interface and the second input interface. On this occasion, the first processor 100 is configured to instruct a first projection module 110 to project the first image IMG01 on a projection surface SC1 according to the first image data, and the second processor is configured to instruct a second projection module to project the second image IMG02 onto the projection surface SC1 according to the second image data. In this embodiment, the first image is the same as the second image, or the first image is different from the second image, and the first image and the second image are both preset images. More specifically, the first image data is used to instruct that the first image is a pure black image (a pure black full picture, a black picture), and the second image data is used to instruct that the second image is a pure black image. In addition, the first image data and the second image data may be separately stored in the storage device of the first projector and the storage device of the second projector.

It should be noted that the disclosure provides no limitation to the types of the first image and the second image. For example, in an embodiment, the first image (or second image) may be a frame of another color (e.g., a pure gray frame, a single primary color frame displaying one of the three primary colors). In another example, in another embodiment, the boundary between the first image and the second image further has a pure color frame, such as a white frame (the color of the frame is different from the color of the image in the frame), so that the user can clearly recognize the boundary between the first image and the second image and the overlapping area of the first image and the second image.

The image of the first portion of the first image IMG01 projected on the projection surface and the image of the second portion of the second image IMG02 overlap in the overlapping area (the light-colored area at the boundary between the first image and the second image as shown in FIG. 4) OIMG on the projection surface SC1, and the brightness of the overlapping image OIMG in the overlapping area is higher than the first image IMG01 and the second image IMG02 of other portions. It should be indicated that the projection plane SC1 may be a flat surface in any forms (e.g., curtain, wall), preferably a customized white projection screen.

Figure 5A:
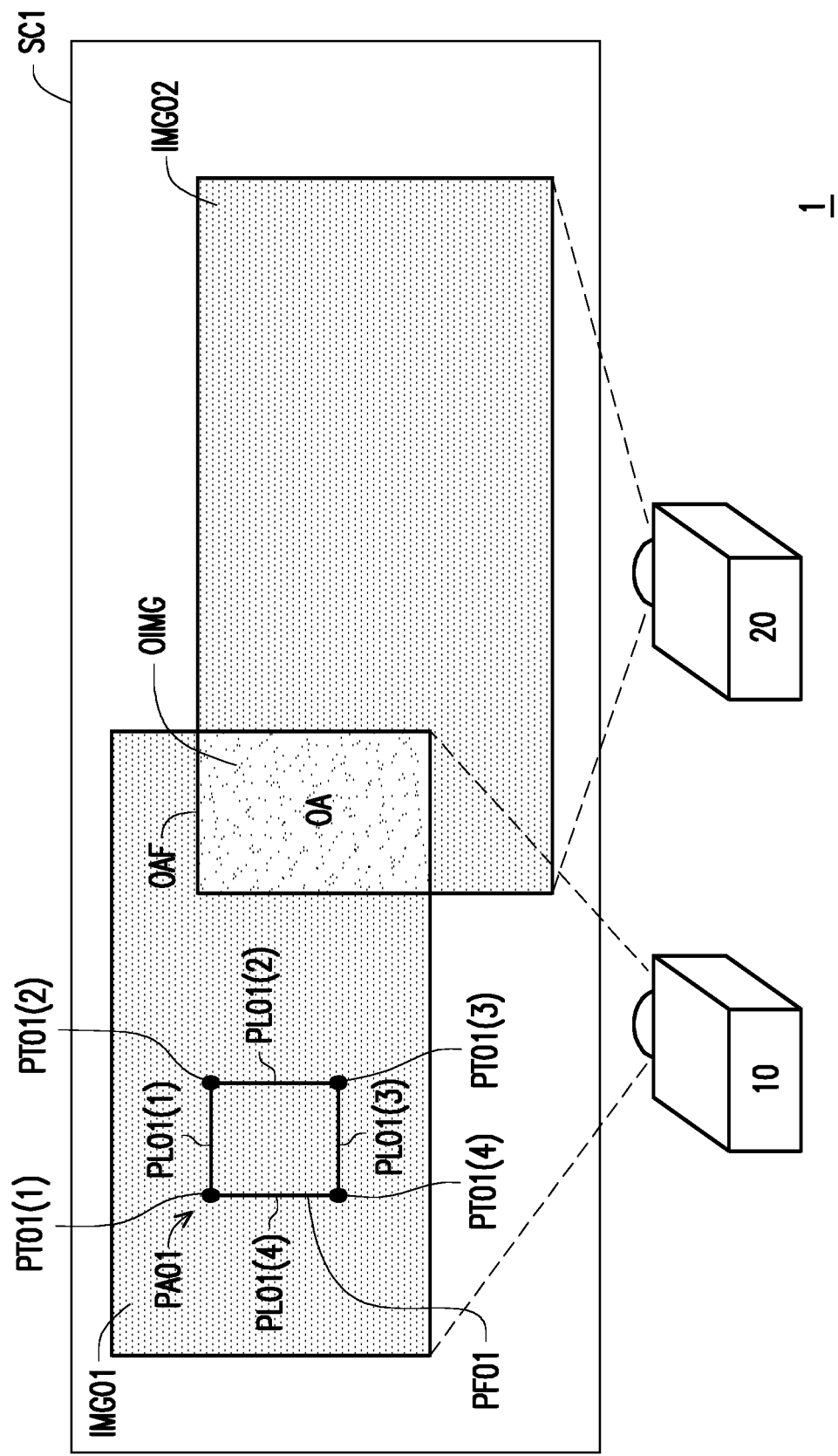
FIG. 5A and FIG. 5B are schematic diagrams illustrating an image blending operation performed by a projector according to an embodiment of the disclosure.
Figure 5B:
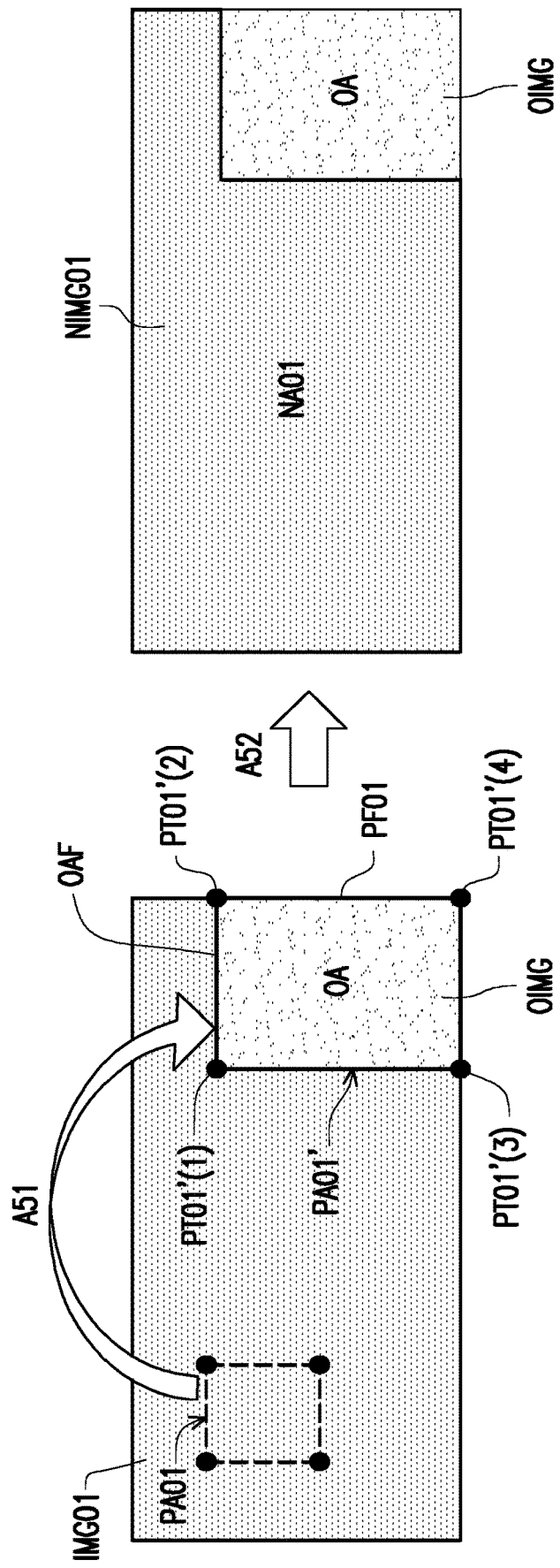
Figure 6A:
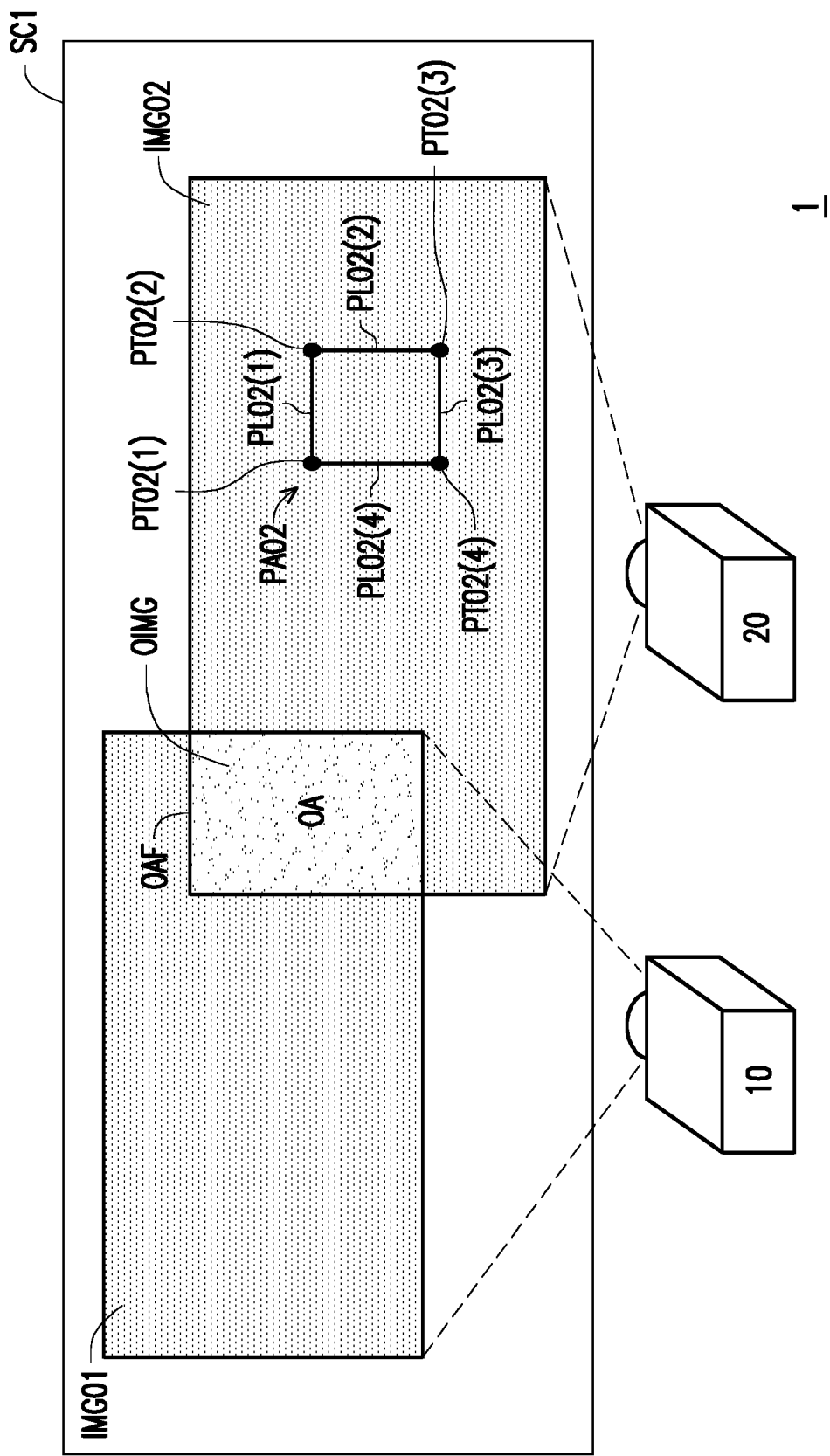
FIG. 6A and FIG. 6B are schematic diagrams illustrating an image blending operation performed by another projector according to an embodiment of the disclosure.
Figure 6B:
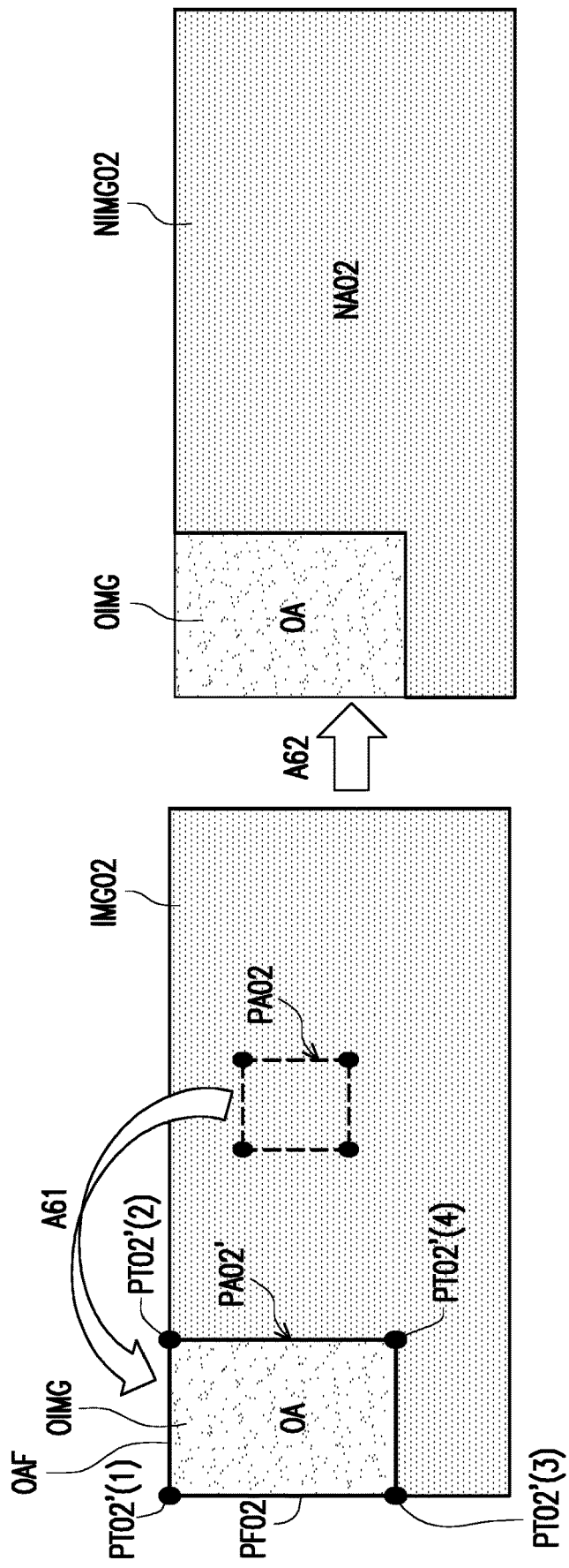

Returning to FIG. 3, after the first image and the second image are both projected onto the projection plane SC1, the user may choose to perform subsequent operations by using the first projector first (e.g., steps S302-S304 corresponding to FIG. 5A, FIG. 5B) or the second projector (e.g., steps S305-S307 corresponding to FIG. 6A, FIG. 6B).

For ease of explanation, the user selects the first projector 10. Next, in step S302, the first control pattern is projected onto the first image IMG01 by the first projector 10.

FIG. 5A and FIG. 5B are schematic diagrams illustrating an image blending operation performed by projectors according to an embodiment of the disclosure.

In the embodiment, the following processing operations are performed by the processor 100 through the user's triggering on the input interface. For example, the user activates a button for indicating execution of the blackening program on the first input interface 150. The first processor 100 is configured to render/extract the first control pattern PA01 and instruct the first projection module 110 to project the first control pattern PA01 onto the first image IMG01. The so-called "Render" refers to a program that creates a model image through a computer program. In another embodiment, the first processor 100 is used to extract the first control pattern PA01 stored in the storage device 130, and to instruct the first projection module 110 to project the first control pattern PA01 onto the first image IMG01.

In this embodiment, the first control pattern includes a plurality of first dots PT01(1) to PT01(4) and a plurality of first straight lines PL01(1) to PL01(4) connecting the plurality of first dots PT01(1) to PT01(4). Specifically, the plurality of first straight lines form a first polygon (e.g., the first polygon formed by the first straight lines PL01(1) to PL01(4) in FIG. 5A is a rectangle), the plurality of first dots are a plurality of vertices of the first polygon, and a boundary of the first polygon is the first control pattern frame PF01 (first straight lines PL01(1) to PLO'(4) are connected as the first control pattern frame PF01). It should be noted that each of the components (i.e., the plurality of first dots PT01(1) to PT01(4) and the plurality of first straight lines PL01(1) to PL01(4)) of the first control pattern may be respectively selected to perform a moving operation. Further, in an embodiment, all of the first dots PT01(1) to PT01(4) may be selected at a time or all of the first straight lines PL01(1) to PL01(4) may be selected at a time. The first processor 100 can continuously recognize and record the position (coordinates) of each component of the first control pattern PA01 in the first image IMG01.

The first control pattern PA01 is preset to be rendered to a first initial position in the first image. The first initial position may be preset as a random position of the first image. The user may use an input operation to set the first initial position of the first control pattern of the first projector 10 for the image blending operation. For example, the user may directly set the first control pattern to appear in the middle or the right side of the first image when it is rendered to the first image for the first time.

Returning to FIG. 2, then, in step S303, the first control pattern in the first image is adjusted by the first projector according to a first input operation applied to the first input interface of the first projector 10, such that the first control pattern frame of the first control pattern matches a boundary OAF of the overlapping area.

Specifically, referring to FIG. 5B, the first processor 100 selects one or more target first dots among the plurality of first dots in the first control pattern PA01 in the first image IMG01 according to the first input operation (e.g., pressing various buttons on the remote control 30 or pressing a button for indicating selection of dots on the first input interface), and moves the one or more target first dots according to the first input operation, wherein when the one or more target first dots are moved, the plurality of first straight lines move correspondingly to continuously connect the plurality of first dots. In other words, by adjusting the positions of the plurality of first dots PT01(1) to PT01(4), the positions of the plurality of first straight lines PL01(1) to PL01(4) can be adjusted correspondingly.

For example, the user may press a first button to select all of the first dots PT01(1) to PT01(4) by the first input operation, and press a second button to make all of the selected first dots PT01(1) to PT01(4) to move to the right; then, after the first control pattern PA01 enters the overlapping area OA, the user may press a third button by the first input operation to respectively select different first dots to perform slight position adjustment to finally match the first control pattern frame PF01 having the adjusted first dots PTO1'(1) to PTO1'(4) to the boundary OAF (as indicated by arrow A51) of the overlapping area OA, and obtain the adjusted first control pattern PA01'. It should be noted that all of the different input operations in this step refer to the first input operation in general. In addition, the first processor 100 may end the adjustment operation of the first control pattern PA01' according to the first input operation for indicating that the adjustment is completed, and stop rendering the first control pattern PA01' into the first image IMG01 (i.e., the first control pattern is removed from the first image).

Returning to FIG. 2, then, in step S304, the position of the first non-overlapping area in the first image is identified by using the first projector according to the position of the matched first control pattern frame, wherein the first non-overlapping area of the first image does not overlap the second image projected by the second projector.

As described above, the first processor 100 may identify the position (coordinates) of each component of the first control pattern PA01' in the first image IMG01. Based on this, the first processor 100 identifies the overlapping area OA in the first image IMG01 according to the coordinate of the first control pattern frame PF01 of the matched first control pattern PA01', and the first processor 100 uses coordinate calculation to identify other areas of the first image that are not overlapping areas OA as the first non-overlapping area NA01 (as indicated by arrow A52). A portion of the first image IMG01 of the first non-overlapping area NA01 is identified as a first non-overlapping image NIMG01.

On the other hand, for the second projector 20, steps S305 to S307 of the second projector 20 are similar to the above steps S302 to S304, and the same details are omitted herein. The following descriptions are made with reference to FIG. 6A and FIG. 6B.

FIG. 6A and FIG. 6B are schematic diagrams illustrating an image blending operation performed by another projector according to an embodiment of the disclosure. Referring to FIG. 3 and FIG. 6A, in step S305, the second control pattern PA02 is projected onto the second image IMG02 by the second projector 20. The second control pattern includes a plurality of second dots PT02(1) to PT02(4) and a plurality of second straight lines PL02(1) to PL02(4) connecting the plurality of second dots PT02(1) to PT02(4).

Referring to FIG. 3 and FIG. 6B, in step S306, the second control pattern PA02 of the second image is adjusted by the second projector 20 according to a second input operation applied to the second input interface of the second projector 20, such that a second control pattern frame PF02 having the adjusted second dots PTO2'(1) to PTO2'(4) matches the boundary OAF (as indicated by arrow A61) of the overlapping area. That is, the adjusted second control pattern PA02' may be obtained through step S306. In addition, the second processor may end the adjustment operation of the second control pattern PA02' according to the second input operation for indicating that the adjustment is completed, and stop rendering the second control pattern PA02' to the second image IMG02 (i.e., the second control pattern is removed from the first image).

Next, in step S307, the second projector 20 is used to identify the position of the second non-overlapping area NA02 in the second image according to the position of the matched second control pattern frame PF02, wherein the second non-overlapping area NA02 of the second image IMG02 does not overlap the first image IMG01 (as indicated by an arrow A62). A portion of the second image IMG02 of the second non-overlapping area NA02 is identified as the second non-overlapping image NIMG02.

FIG. 7 is a schematic diagram illustrating an image blending operation performed by a projection system according to an embodiment of the disclosure.

Referring to FIG. 7 and FIG. 3, in step S308, the image parameters of all the pixels of the first non-overlapping area NA01 and the second non-overlapping area NA02 are adjusted by the first projector and the second projector according to the position of the first non-overlapping area NA01 and the position of the second non-overlapping area NA02, so that the black-level brightness of the first non-overlapping image NIMG01 in the first non-overlapping area NA01 of the first image IMG01 and the black-level brightness of the second non-overlapping image NIMG02 in the second non-overlapping area NA02 of the second image IMG02 correspond to the black-level brightness of the overlapping image OIMG in the overlapping area OA. The image parameters include three primary color light (RGB) values. In another embodiment, the image parameters may also include a brightness value, a grayscale value etc. The so-called black-level brightness refers to the brightness of the blended image picture that the user views when projecting a black picture. That is, the first non-overlapping image NIMG01, the second non-overlapping image NIMG02, and the overlapping image OIMG exhibit substantially uniform brightness values (grayscale values) in the user's visual perception.

More specifically, the above step S308 may be further implemented in two ways: (1) a separate adjustment method; and (2) a mutual adjustment method.

In the "separate adjustment method", in step S308, the step that the first processor and the second processor are each further configured to adjust the image parameters of all pixels of the first non-overlapping area and the second non-overlapping area according to the position of the first non-overlapping area and the position of the second non-overlapping area further includes the following steps: the first processor 100 adjusts the image parameters corresponding to all pixels in the first non-overlapping image NIMG01 in the first image data from a first value to a second value according to a third input operation applied to the first input interface of the first projector 10, wherein the second value is greater than the first value, and the black-level brightness of the first non-overlapping image NIMG01 corresponding to the second value is greater than the black-level brightness of the first non-overlapping image NIMG01 corresponding to the first value; and the second processor adjusts the image parameters corresponding to all pixels in the second non-overlapping image NIMG02 in the second image data from the first value to a third value, wherein the third value is greater than the first value, and the black-level brightness of the second non-overlapping image NIMG02 corresponding to the third value is greater than the black-level brightness of the second non-overlapping image NIMG02 corresponding to the first value. In other words, the user may perform the third input operation and a fourth input operation by using the first input interface and the second input interface, respectively, to gradually increase the image parameters of all the pixels of the first non-overlapping image NIMG01 in the first non-overlapping area NA01 of the first image IMG01 and the image parameters of all the pixels of the second non-overlapping image NIMG02 in the second non-overlapping area NA02 of the second image IMG02, such that the black-level brightness of the first non-overlapping image NIMG01 and the second non-overlapping image NIMG02 becomes higher and higher. The third input operation and the fourth input operation are performed by, for example, a user pressing a button for indicating increase in the image parameter. The second value and the third value are both greater than the first value, and the second value and the third value may be the same, but the second value and the third value may also be different. For example, the first value, the second value, and the third value are, for example, grayscale values, and the grayscale values of the pixels are from 0 to 255 levels, so when adjustment is to be made, one level value may be adjusted at a time.

In addition, in the "separate adjustment method", in the step S308, the step of making the black-level brightness of the first non-overlapping image in the first non-overlapping area of the first image and the black-level brightness of the second non-overlapping image in the second non-overlapping area of the second image to correspond to the black-level brightness of the overlapping image in the overlapping area includes the following steps: the first processor 100 determines that the black-level brightness of the first non-overlapping image NIMG01 of the first non-overlapping area NA01 of the first image IMG01 corresponds to the black-level brightness of the overlapping image OIMG in the overlapping area OA according to a fifth input operation applied to the first input interface of the first projector 10, and completes the adjustment of the image parameters of all pixels of the first non-overlapping image NIMG01; and the second processor determines that the black-level brightness of the second non-overlapping image NIMG02 in the second non-overlapping area NA02 of the second image IMG02 corresponds to the black-level brightness of the overlapping image OIMG in the overlapping area OA according to a sixth input operation applied to the second input interface of the second projector, and completes the adjustment of the image parameters of all pixels of the second non-overlapping image NIMG02. That is, in the process of adjusting the image parameters of all the pixels of the first non-overlapping image NIMG01, when the user feels that the black-level brightness of the first non-overlapping image NIMG01 is equal to the black-level brightness of the overlapping image OIMG, the user may instruct the first processor 100 to complete the adjustment of the image parameters of all pixels of the first non-overlapping image NIMG01 by a fifth input operation (e.g., pressing a button indicating completion). In other words, on this occasion, the adjusted image parameters of all the pixels of the first non-overlapping image NIMG01 allow the black-level brightness of the first non-overlapping image NIMG01 to be equal to the black-level brightness of the overlapping image OIMG (the black-level brightness of the two look equal). Similarly, in the process of adjusting the image parameters of all the pixels of the second non-overlapping image NIMG02, when the user feels that the black-level brightness of the second non-overlapping image NIMG02 is equal to the black-level brightness of the overlapping image OIMG, the user may instruct the second processor to complete the adjustment of the image parameters of all the pixels of the second non-overlapping image NIMG02 by the sixth input operation, that is, on this occasion, the adjusted image parameters of all the pixels of the second non-overlapping image NIMG02 allow the black-level brightness of the second non-overlapping image NIMG01 to be equal to the black-level brightness of the overlapping image OIMG (the black-level brightness of the two look equal).

That is to say, before the adjustment, the black-level brightness of the first non-overlapping image NIMG01 is lower than the black-level brightness of the overlapping image OIMG (the first non-overlapping image NIMG01 looks darker than the overlapping image OIMG), and the black-level brightness of the second non-overlapping image NIMG02 is lower than the black-level brightness of the overlapping image OIMG (the second non-overlapping image NIMG01 looks darker than the overlapping image OIMG).

As shown by arrow A71, after the adjustment of the image parameters of all the pixels of the first non-overlapping image NIMG01 and the second non-overlapping image NIMG02 is completed, the black-level brightnesses of the first non-overlapping image NIMG01, the overlapping image OIMG and the second non-overlapping image NIMG02 are equal to each other (the user cannot identify which area is darker). As a result, the blackening process in the image blending operation is also completed.

In the "mutual adjustment method", in step S308, the step that the first processor and the second processor are each further configured to adjust the image parameters of all pixels of the first non-overlapping area and the second non-overlapping area according to the position of the first non-overlapping area and the position of the second non-overlapping area further includes the following steps: the first processor 100 adjusts the image parameters corresponding to all pixels in the first non-overlapping image in the first image data from a first value to a second value according to the third input operation applied to the first input interface 150 of the first projector 10, and instructs the second processor to adjust the image parameters corresponding to all pixels in the second non-overlapping image in the second image data from the first value to the second value. Alternatively, the second processor adjusts the image parameters corresponding to all pixels in the second non-overlapping image of the second image data from the first value to the second value according to a fourth input operation applied to the second input interface of the second projector, and instructs the first processor 100 to adjust the image parameters corresponding to all pixels in the first non-overlapping image in the first image data from the first value to the second value, wherein the second value is greater than the first value, and the black-level brightnesses of the first non-overlapping image and the second non-overlapping image corresponding to the second value are greater than the black-level brightnesses of the first non-overlapping image and the second non-overlapping image corresponding to the first value.

That is, when the user gradually increases the image parameters of all the pixels of the first non-overlapping image NIMG01 by using the first input interface, the first processor 100 may instruct the second processor to increase the image parameters of all pixels of the second non-overlapping image NIMG02 through a connection (e.g., a connection established by the communication circuit unit) between the first projector 10 and the second projector 20. Alternatively, when the user gradually increases the image parameters of all the pixels of the second non-overlapping image NIMG02 by using the second input interface, the second processor may instruct the first processor 100 to increase the image parameters of all pixels of the first non-overlapping image NIMG01 through the connection (e.g., the connection established by the communication circuit unit) between the second projector 20 and the first projector 10. That is, in the "mutual adjustment method", the adjustment of the image parameters of the pixels of the non-overlapping image performed by one projector in one projection system may be synchronized to other connected projectors, such that all the pixels of the non-overlapping images of other projectors are adjusted in the same manner. Certainly, in the "mutual adjustment method", the projector may also receive an input operation for indicating that adjustment of all pixels of the non-overlapping image is completed (e.g., the user may instruct the first processor or the second processor to complete adjustment of the image parameters of all pixels of all the non-overlapping images through an input operation).

It should be indicated that the "separate adjustment method" and the "mutual adjustment method" may be used collaboratively. For example, the user may adjust the image parameters of the pixels of all the non-overlapping images by using the "mutual adjustment method" first until the black-level brightnesses of all the non-overlapping images are similar to the black-level brightness of the overlapping image. Then, the user uses the "separate adjustment method" to adjust the image parameters of respective non-overlapping image of each of the projectors, and slightly adjusts the black-level brightness of each of the projectors so that the black level brightnesses of all non-overlapping images are similar to or equal to the black-level brightness of the overlapping image.

Further, the disclosure is not limited to the first control pattern and the second control pattern described above. For example, in another embodiment, the first control pattern and the second control pattern may have more dots and a plurality of straight lines connecting the plurality of dots. By means of the remote control 30 or the OSD (on screen display) of the projector 10, an option for selecting the number of dots of the control pattern, for example, the number of dots 2X2, 3X3 or 9X9, may be selected as the control pattern, but the projected control pattern only shows the dots on the frame, and the inner dots need not appear. When a plurality of number of dots are used, a more precise position (coordinate) of the overlapping area OA can be obtained.

In another example, in another embodiment, the first control pattern and the second control pattern may include two-dimensional color blocks having adjustable range and shape, and the user may adjust and move the two-dimensional color blocks by an input operation to match the two-dimensional color blocks to the overlapping areas.

On the other hand, in another embodiment, if there are a plurality of overlapping areas (for example, a first overlapping area and a second overlapping area) between the image projected by one projector (e.g., the second image projected by the second projector) and the other plurality of projected images (e.g., the first image and the second image), the second projector may sequentially render the control patterns (e.g., two control patterns) corresponding to the total number of overlapping areas to the second image, thereby respectively adjusting the plurality of control patterns to match all the overlapping areas, thus identifying the non-overlapping areas excluded from all the overlapping areas in the second image.

In summary, the image blending method and the projection system provided by the embodiments of the disclosure may project multiple control patterns, and identify a plurality of non-overlapping areas of the plurality of images by adjusting multiple control patterns to match overlapping areas between multiple images projected by multiple projectors, thus adjusting the image parameters of the images in the plurality of non-overlapping areas, so that the black-level brightness of all of the plurality of projected images are uniform. In this manner, not only that the multiple steps of the blackening process in the image blending operation can be simplified, but also the non-overlapping areas with irregular shapes can be efficiently identified, and the time consumed for the image blending operation for multiple projection images can be reduced, which in turn increases the overall operation efficiency of the projection system.

Although the disclosure has been disclosed by the above embodiments, the embodiments are not intended to limit the disclosure. It will be apparent to those skilled in the art that various modifications and variations can be made to the structure of the disclosure without departing from the scope or spirit of the disclosure. Therefore, the protecting range of the disclosure falls in the appended claims.

What is claimed is:

1. An image blending method configured for a plurality of images projected by a plurality of projectors, the method comprising:

projecting a first image and a second image onto a projection surface by a first projector of the plurality of projectors and a second projector of the plurality of projectors respectively, wherein the first image and the second image overlap each other in an overlapping area;

projecting, by the first projector, a first control pattern onto the first image;

adjusting the first control pattern in the first image by the first projector according to a first input operation applied to a first input interface of the first projector, such that a first control pattern frame of the first control pattern matches a boundary of the overlapping area;

identifying, by the first projector, a position of a first non-overlapping area in the first image according to a position of the matched first control pattern frame, wherein the first non-overlapping area of the first image does not overlap the second image;

projecting a second control pattern onto the second image by the second projector;

adjusting the second control pattern in the second image by the second projector according to a second input operation applied to a second input interface of the second projector, such that a second control pattern frame of the second control pattern matches the boundary of the overlapping area;

identifying, by the second projector, a position of a second non-overlapping area in the second image according to a position of the matched second control pattern frame, wherein the second non-overlapping area of the second image does not overlap the first image; and adjusting, by the first projector and the second projector, image parameters of all pixels of the first non-overlapping area and the second non-overlapping area according to the position of the first non-overlapping area and the position of the second non-overlapping area, such that a black-level brightness of a first non-overlapping image in the first non-overlapping area of the first image and a black-level brightness of a second non-overlapping image in the second non-overlapping area correspond to a black-level brightness of an overlapping image in the overlapping area, wherein the step of identifying the position of the first non-overlapping area in the first image according to the position of the matched first control pattern frame by the first projector comprises:

identifying, according to the position of the first control pattern frame in the first image, an area outside the first control pattern frame in the first image as the first non-overlapping area, wherein the step of identifying, by the second projector, the position of the second non-overlapping area in the second image according to the position of the matched second control pattern frame comprises:

identifying, according to the position of the second control pattern frame in the second image, an area outside the second control pattern frame in the second image as the second non-overlapping area.

2. The image blending method according to claim 1, wherein the image parameter comprises a grayscale value or a three primary color light (RGB) value.

3. The image blending method according to claim 1, wherein the first control pattern comprises:

a plurality of first dots and a plurality of first straight lines connecting the plurality of first dots, wherein the plurality of first straight lines form a first polygon, and the plurality of first dots are a plurality of vertices of the first polygon, and a boundary of the first polygon is the first control pattern frame, and the second control pattern comprising:

a plurality of second dots and a plurality of second straight lines connecting the plurality of second dots, wherein the plurality of second straight lines form a second polygon, and the plurality of second dots are a plurality of vertices of the second polygon, and a boundary of the second polygon is the second control pattern frame.

4. The image blending method according to claim 3, wherein the step of adjusting the first control pattern in the first image by the first projector according to the first input operation applied to the first input interface of the first projector comprises:

selecting one or more of a plurality of target first dots of the plurality of first dots in the first image according to the first input operation, and moving the one or more target first dots according to the first input operation, wherein when the one or more target first dots are moved, the plurality of first straight lines move correspondingly to continuously connect the plurality of first dots, wherein the step of adjusting the second control pattern in the second image by the second projector according to the second input operation applied to the second input interface of the second projector comprises:

selecting one or a plurality of target second dots of the plurality of second dots in the second image according to the second input operation, and moving the one or the plurality of target second dots according to the second input operation, wherein when the one or the plurality of target second dots are moved, the plurality of second straight lines move correspondingly to continuously connect the plurality of second dots.

5. The image blending method according to claim 1, wherein the first image is the same as the second image or the first image is different from the second image, and the first image and the second image comprising:

a pure black picture;

a pure gray picture; or a single primary color picture.

6. The image blending method according to claim 5, wherein a boundary between the first image and the second image further has a pure color frame, wherein a color of the pure color frame is different from a color of the first image and the second image.

7. The image blending method according to claim 1, wherein the step of adjusting the image parameters of all the pixels of the first non-overlapping area and the second non-overlapping area by the first projector and the second projector according to the position of the first non-overlapping area and the position of the second non-overlapping area comprises:

adjusting the image parameters of all the pixels in the first non-overlapping image from a first value to a second value by the first projector according to a third input operation applied to the first input interface of the first projector, wherein the second value is greater than the first value, and a black-level brightness of the first non-overlapping image corresponding to the second value is greater than a black-level brightness of the first non-overlapping image corresponding to the first value; and adjusting the image parameters of all the pixels in the second non-overlapping image from the first value to a third value by the second projector according to a fourth input operation applied to the second input interface of the second projector, wherein the third value is greater than the first value, and a black-level brightness of the second non-overlapping image corresponding to the third value is greater than a black-level brightness of the second non-overlapping image corresponding to the first value.

8. The image blending method according to claim 7, wherein the step of making the black-level brightness of the first non-overlapping image in the first non-overlapping area of the first image and the black-level brightness of the second non-overlapping image in the second non-overlapping area of the second image to correspond to the black-level brightness of the overlapping image in the overlapping area comprises:

determining that the black-level brightness of the first non-overlapping image in the first non-overlapping area of the first image corresponds to the black-level brightness of the overlapping image in the overlapping area according to a fifth input operation applied to the first input interface of the first projector, and completing adjustment of the image parameters of all pixels of the first non-overlapping image; and determining that the black-level brightness of the second non-overlapping image in the second non-overlapping area of the second image corresponds to the black-level brightness of the overlapping image in the overlapping area according to a sixth input operation applied to the second input interface of the second projector, and completing adjustment of the image parameters of all pixels of the second non-overlapping image.

9. The image blending method according to claim 1, wherein the step of adjusting the image parameters of all the pixels of the first non-overlapping area and the second non-overlapping area by the first projector and the second projector according to the position of the first non-overlapping area and the position of the second non-overlapping area comprises:

adjusting the image parameter of all the pixels in the first non-overlapping image from a first value to a second value by the first projector according to a third input operation applied to the first input interface of the first projector, and instructing, by the first projector, the second projector to adjust the image parameter of all pixels in the second non-overlapping image from the first value to the second value; or adjusting the image parameter of all the pixels in the second non-overlapping image from a first value to a second value by the second projector according to a fourth input operation applied to the second input interface of the second projector, and instructing, by the second projector, the first projector to adjust the image parameter of all pixels in the first non-overlapping image from the first value to the second value, wherein the second value is greater than the first value, and black-level brightnesses of the first non-overlapping image and the second non-overlapping image corresponding to the second value are greater than black-level brightnesses of the first non-overlapping image and the second non-overlapping image corresponding to the first value.

10. A projection system, wherein the projection system comprises a first projector and a second projector, wherein:

the first projector comprises a first processor, a first input interface, a first connection interface, and a first projection module; and the second projector comprises a second processor, a second input interface, a second connection interface, and a second projection module, wherein the first processor is configured to instruct the first projection module to project a first image onto a projection surface according to a first image data, and the second processor is configured to instruct the second projection module to project a second image onto the projection surface according to a second image data, wherein an image of a first portion of the first image projected on the projection surface and an image of a second portion of the second image overlap with each other in an overlapping area on the projection surface, wherein the first processor is configured to render a first control pattern, and instruct the first projection module to project the first control pattern onto the first image, wherein the first processor is configured to adjust the first control pattern in the first image according to a first input operation applied to the first input interface, such that a first control pattern frame of the first control pattern matches a boundary of the overlapping area, wherein the first processor is configured to identify a position of a first non-overlapping area in the first image according to a position of the matched first control pattern frame, wherein the first non-overlapping area of the first image does not overlap the second image, wherein the second processor is configured to render a second control pattern, and instruct the second projection module to project the second control pattern onto the second image, wherein the second processor is configured to adjust the second control pattern in the second image according to a second input operation applied to the second input interface, such that a second control pattern frame of the second control pattern matches a boundary of the overlapping area, wherein the second processor is configured to identify a position of a second non-overlapping area in the second image according to a position of the matched second control pattern frame, wherein the second non-overlapping area of the second image does not overlap the first image, wherein the first processor and the second processor are each configured to adjust image parameters of all pixels of the first non-overlapping area and the second non-overlapping area according to the position of the first non-overlapping area and the position of the second non-overlapping area, such that a black-level brightness of a first non-overlapping image in the first no overlapping area of the first image and a black-level brightness of a second non-overlapping image in the second non-overlapping area of the second image correspond to a black-level brightness of an overlapping mage in the overlapping area, wherein in the operation of identifying the position of the first non-overlapping area in the first image by the first processor according to the position of the matched first control pattern frame, the first processor identifies, according to the position of the first control pattern frame in the first image, an area outside the first control pattern frame in the first image as the first non-overlapping area, wherein in the operation of identifying, by the second processor, the position of the second non-overlapping area in the second image according to the position of the matched second control pattern frame, the second processor identifies, according to the position of the second control pattern frame in the second image, an area outside the second control pattern frame in the second image as the second non-overlapping area.

11. The projection system according to claim 10, wherein the image parameter comprises a grayscale value or a three primary color light (RGB) value.

12. The projection system according to claim 10, wherein the first control pattern comprises:

a plurality of first dots and a plurality of first straight lines connecting the plurality of first dots, wherein the plurality of first straight lines form a first polygon, and the plurality of first dots are a plurality of vertices of the first polygon, and a boundary of the first polygon is the first control pattern frame, and the second control pattern comprising:
a plurality of second dots and a plurality of second straight lines connecting the plurality of second dots, wherein the plurality of second straight lines form a second polygon, and the plurality of second dots are a plurality of vertices of the second polygon, and a boundary of the second polygon is the second control pattern frame.

13. The projection system according to claim 12, wherein in the operation of adjusting the first control pattern by the first processor according to the first input operation applied to the first input interface,
the first processor selects one or a plurality of target first dots of the plurality of first dots in the first image according to the first input operation, and moves the one or a plurality of target first dots according to the first input operation, wherein when the one or the plurality of target first dots are moved, the plurality of first straight lines move correspondingly to continuously connect the plurality of first dots,
wherein in the operation of adjusting the second control pattern in the second image by the second processor according to the second input operation applied to the second input interface of the second projector,
the second processor selects one or a plurality of target second dots of the plurality of second dots in the second image according to the second input operation, and moves the one or the plurality of target second dots according to the second input operation, wherein when the one or the plurality of target second dots are moved, the plurality of second straight lines move correspondingly to continuously connect the plurality of second dots.

14. The projection system according to claim 10, wherein the first image is the same as the second image or the first image is different from the second image, and the first image and the second image comprise:
a pure black picture;
a pure gray picture; or
a single primary color picture.

15. The projection system according to claim 10, wherein a boundary between the first image and the second image further has a pure color frame.

16. The projection system according to claim 10, wherein in the operation of adjusting the image parameters of all the pixels of the first non-overlapping area and the second non-overlapping area by the first processor and the second processor according to the position of the first non-overlapping area and the position of the second non-overlapping area,
the first processor adjusts the image parameter corresponding to all the pixels in the first non-overlapping image in the first image data from a first value to a second value according to a third input operation applied to the first input interface of the first projector, wherein the second value is greater than the first value, and a black-level brightness of the first non-overlapping image corresponding to the second value is greater than a black-level brightness of the first non-overlapping image corresponding to the first value,
wherein the second processor adjusts the image parameter corresponding to all the pixels in the second non-overlapping image in the second image data from the first value to a third value according to a fourth input operation applied to the second input interface of the second projector, wherein the third value is greater than the first value, and a black-level brightness of the second non-overlapping image corresponding to the third value is greater than a black-level brightness of the second non-overlapping image corresponding to the first value.

17. The projection system according to claim 16, wherein in the operation of making the black-level brightness of the first non-overlapping image in the first non-overlapping area of the first image and the black-level brightness of the second non-overlapping image in the second non-overlapping area of the second image to correspond to the black-level brightness of the overlapping image in the overlapping area,
the first processor determines that the black-level brightness of the first non-overlapping image in the first non-overlapping area of the first image corresponds to the black-level brightness of the overlapping image in the overlapping area according to a fifth input operation applied to the first input interface of the first projector, and completes adjustment of the image parameter of all the pixels of the first non-overlapping image,
wherein the second processor determines that the black-level brightness of the second non-overlapping image in the second non-overlapping area of the second image corresponds to the black-level brightness of the overlapping image in the overlapping area according to a sixth input operation applied to the second input interface of the second projector, and completes adjustment of the image parameter of all the pixels of the second non-overlapping image.

18. The projection system according to claim 10, wherein in the operation of adjusting the image parameters of all the pixels of the first non-overlapping area and the second non-overlapping area by the first processor and the second processor according to the position of the first non-overlapping area and the position of the second non-overlapping area,
the first processor adjusts the image parameter corresponding to all the pixels in the first non-overlapping image in the first image data from a first value to a second value according to a third input operation applied to the first input interface of the first projector, and instructs the second processor to adjust the image parameter corresponding to all the pixels in the second non-overlapping image in the second image data from the first value to the second value; or
the second processor adjusts the image parameter corresponding to all the pixels in the second non-overlapping image in the second image data from a first value to a second value according to a fourth input operation applied to the second input interface of the second projector, and instructs the first processor to adjust the image parameter corresponding to all the pixels in the first non-overlapping image in the first image data from the first value to the second value,
wherein the second value is greater than the first value, and black-level brightnesses of the first non-overlapping image and the second non-overlapping image corresponding to the second value are greater than black-level brightnesses of the first non-overlapping image and the second non-overlapping image corresponding to the first value.

* * * * *